United States Patent [19]

Hsiao et al.

[11] 4,176,354
[45] Nov. 27, 1979

[54] PHASED-ARRAY MAINTENANCE-MONITORING SYSTEM

[75] Inventors: James K. Hsiao, Oxon Hill, Md.; J. Paul Shelton, Arlington, Va.

[73] Assignee: The United States of America as represented by the Secretary of the Navy, Washington, D.C.

[21] Appl. No.: 937,310

[22] Filed: Aug. 25, 1978

[51] Int. Cl.² .............................................. G01S 7/40
[52] U.S. Cl. ................................................. 343/17.7
[58] Field of Search ..................................... 343/17.7

[56] References Cited

U.S. PATENT DOCUMENTS

| | | | |
|---|---|---|---|
| 3,471,855 | 10/1969 | Thompson | 343/17.7 |
| 3,604,000 | 9/1971 | Briana et al. | 343/17.7 |
| 4,060,806 | 11/1977 | Davies et al. | 343/17.7 |

*Primary Examiner*—T. H. Tubbesing

*Attorney, Agent, or Firm*—R. S. Sciascia; Philip Schneider; William C. Daubenspeck

[57] ABSTRACT

A system and method for monitoring the operability of a radar system having a phased-array antenna system. During an initial radiation pattern, a portion of the signals radiated from each radiating element of the array (except, in general, a center element, if any) is fed to a manifold network which combines the signals received from radiating elements which are symmetrically located with respect to the center of the array so that they differ by 180° at the single manifold output. Radio-frequency energy is added to the manifold output to adjust it to approximately zero. While the radio-frequency energy added to the manifold network is maintained at this value, the phase-shift settings of pairs of radiating elements having equal amplitude-weighting are varied from the initial setting through 360°. Failures are located by correlating the phase-shift settings and the adjusted output of the manifold network.

8 Claims, 1 Drawing Figure

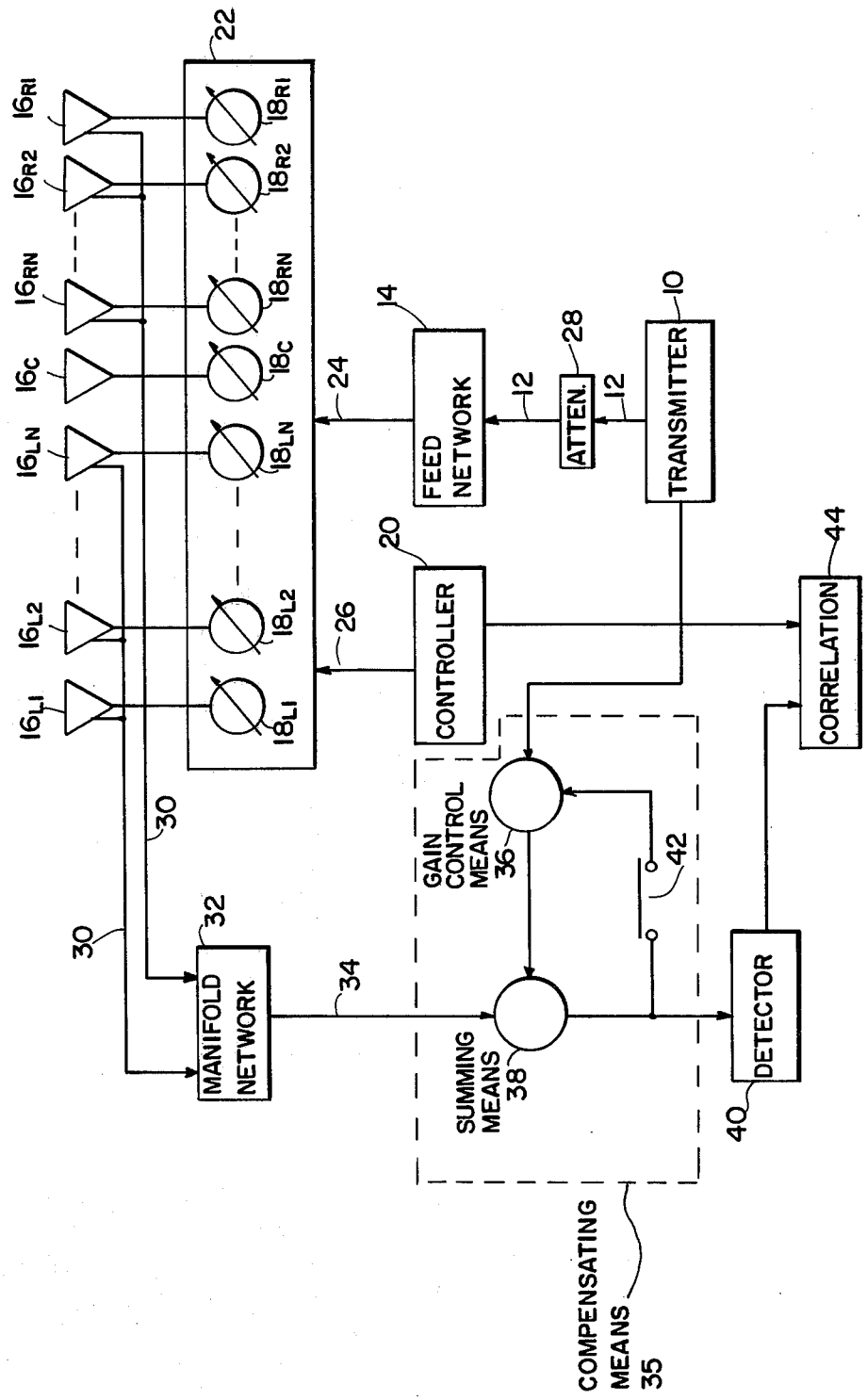

PHASED-ARRAY MAINTENANCE-MONITORING SYSTEM

BACKGROUND OF THE INVENTION

This invention relates generally to the testing of radar systems and, more particularly, to a method and system for testing radar systems employing phased-array antenna systems.

A phased-array system consists of a large number of identical radiating elements and phase-shifting elements. Because of this redundancy, failures of a few elements have little effect on the array performance. This graceful degradation feature is one of the advantages of a phased-array system. However, because of this phenomenon, it is very difficult to determine when the array has deteriorated to the extent that its performance is not acceptable. Furthermore, it is difficult to obtain an accurate assessment of the array performance during operation due to constant variations in environmental conditions and the complexity of the phased-array system. Nevertheless, it is often necessary to monitor the operating characteristics of a system to ensure that an acceptable level of performance is maintained. Defective elements must be detected so that they may be replaced at the earliest convenient time.

A number of monitoring techniques are applicable to any phased-array antenna. In the past, an array-monitoring system usually sampled the output of the phase-shifter driving network on the assumption that the phase shifters and the feed network are passive elements which seldom develop failures. However, a radio-frequency (rf) monitoring system which can detect any failure from the transmitter to the radiating array has clear advantages over systems which monitor the operation of selected components. Furthermore, with the development of limited-scanning antennas, the feed networks have become more complicated. Although passive networks are highly reliable, monitoring techniques which can detect failures in such networks are needed.

SUMMARY OF THE INVENTION

It is, therefore, an object of the present invention to provide an improved system and method for monitoring the radiation pattern of a radar employing a phased-array system.

It is another object of the present invention to provide a system and method for monitoring the operability of the phase-shifting elements and feed network in a phased-array system.

These and other objects are attained by comparing the signals radiated from a first radiating element with signals radiated from a second radiating element where the two signals have equal amplitude-weighting. For this purpose, the array's phase-shifting elements are first set to provide a preselected radiation pattern and a portion of the signal radiated from every array channel to be tested is fed to a manifold network. The manifold network combines the inputs so that signals from radiating elements that are symmetrically located with respect to the array center (and thus have equal amplitude-weighting) differ by 180 degrees at the manifold output. Although the manifold output is ideally zero, variations in phase and amplitude due to failures and other variations in the system will cause the output to be nonzero. Radio-frequency energy is added to the output to adjust it to approximately zero. The phase-shift settings of symmetrically located channels are now cycled from the preselected setting through 360 degrees and the adjusted output of the manifold monitored. Failures may be located by correlating the phase-shifter settings and the adjusted output of the manifold network, with a zero signal indicating no failure and a nonzero signal indicating a failure.

Additional advantages and features of the present invention will become apparent from the following detailed description when considered in conjunction with the accompanying drawing.

BRIEF DESCRIPTION OF THE DRAWING

The single FIGURE is a block diagram illustrating an embodiment of the phased-array maintenance monitoring system of the present invention.

DESCRIPTION OF THE PREFERRED EMBODIMENT

The present invention is described as it applies to a radar system which employs a linear-array antenna system. It will be obvious to a person skilled in the art that the technique of the present invention may be easily extended to radar systems employing planar arrays. It is noted that, in order to illustrate the invention most clearly, the radar system with which it is associated is illustrated in elementary form, omitting well-known details which are not essential to the understanding of the invention.

Referring now to the FIGURE, in the typical radar system employing a phased-array system, a transmitter 10 provides rf energy which is coupled over a transmission line 12 to a feed network 14. The rf energy is then distributed by the feed network 14 to a phased-array antenna system (a linear array is shown), which includes identical radiating elements $16_{L1}, 16_{L2}, \ldots, 16_{LN}$ and $16_{R1}, 16_{R2}, \ldots 16_{RN}$ where subscripts L and R indicate that the radiating elements are located to the left and right, respectively, of the array center, and identical phase-shifting elements (phase shifters) $18_{L1}, 18_{L2}, \ldots 18_{LN}$ and $18_{R1}, 18_{R2}, \ldots 18_{RN}$, each associated with a different radiating element. In the case of an array having an odd number of radiating elements, an additional radiating element ($16_C$) having an associated phase shifter ($18_C$) is located at the array center. Typically, symmetrically located (relative to the array center) channels, where a channel is a radiating element 16 and its associated phase shifter 18, have equal and non-variable weighting. For example, signals radiated from radiating elements $16_{L1}$ and $16_{R1}$, which are located at opposite ends of the linear array, typically have equal amplitudes.

In normal operation, the rf energy is fed to the phase-shifting elements 18 which are set by a controller 20 to shift the phase of the rf energy coupled to the radiating elements 16 to produce a desired radiation pattern. To simplify the drawing, the phase shifters 18 have been enclosed by a block 22 and lines 24 and 26 have been used to represent the signals which are fed to each phase shifter. Thus line 24 represents rf energy distributed by the feed network 14 to each phase shifter 18 and similarly line 26 represents control signals coupled from controller 20.

The array-monitoring system of the present invention, which operates when the radar is off-line, uses the symmetry inherent in the phased-array system to monitor the system for failures. That is, the present invention takes advantage of the fact that signals radiated from symmetricaly located elements have equal amplitudes by using a first channel to test a second equally weighted channel and vice versa. To accomplish this, an initial state is achieved in the following manner: The phase shifters 18 are set by control signals received from controller 20 over line 26 to provide an initial radiation pattern during the test. This pattern may be collimated in some specific direction, but it is usually preferrable to have an essentially omnidirectional pattern so that the energy is not collimated into a beam. In addition, the overall level of the radiation pattern may be reduced by inserting an adjustable attenuator 28 in the transmission line 12 between the transmitter 10 and the feed network 14. The output of each radiating element 16 (except for the output of the center element $16_C$ if any) in the array is sampled and the sampled signals 30 are combined in a manifold network 32 having a single output 34. The manifold network 32 operates on the sampled signals 30 such that at its output 34, the phases of the signals received from symmetrically located radiating elements differ by 180 degrees. Since these signals from symmetrically located radiating elements are of equal amplitude and have been adjusted to differ by 180 degrees in phase in the manifold network 32, the vector contributions from all the elements of the array theoretically add to zero at the manifold output 34.

The characteristics of the manifold network 32 may be illustrated by an example. Assume the initial state is to be achieved using an omnidirectional radiation pattern. Such a pattern may be produced if each phase shifter $18_{L1}-18_{LN}$ on the left is set to a random value and each symmetrically located phase shifter $18_{R1}-18_{RN}$ on the right is set to the same random value. For example, phase shifters $18_{L1}$ and $18_{R1}$ are set to provide the same phase shift. Since the symmetrically located channels have equal weighting, the required output 34 will be produced, in this case, if the sampled signals received from the left side of the array are subtracted from those signals received from the right side. Therefore, for this initial radiation pattern, a simple subtraction circuit will serve as the manifold network 32. However, if an initial radiation pattern in which the phase-shift settings of symmetrically located elements are not the same is required, a more complicated manifold network is necessary.

However, amplitude and phase variation due to tolerances, temperature variations, and the like, will cause the output of the manifold network 32 to be nonzero. In addition, a failure anywhere in the phased-array system will cause the output to be nonzero (unless the failures combine to compensate for each other). Therefore, the output of the manifold network 32 is fed to a compensating means 35 (including a gain control means 36, a summing means 38 and a switch 42) where it is adjusted to be approximately zero by the addition of rf energy from the transmitter 10. The rf energy is coupled from the transmitter 10 via the gain control means 36 to the summing means 38 where it is combined with the output 34 of the manifold network 32. The output of the summing means 38 is fed back to the gain control means 36 as an error signal to adjust the phase and amplitude of the rf energy output from the gain control means. In this manner, the output of the summing means is set to a quiescent state of approximately zero amplitude. The output of summing means 38 is also applied to a conventional threshold detector 40.

When the output of the summing means 38 has been adjusted to zero, a switch 42 opens the feedback path, removing the error signal from the gain control 36 and fixing the amplitude and phase of the adjustment signal therefrom. The initial state is thereby established.

It is noted that in phased-array systems having an odd number of channels, the center channel is unique. If output at the center radiating element $16_C$ is sampled and fed into the manifold network 32, this signal must be compensated for by the adjustment signal in establishing the initial state.

The philosophy of operation at this point is to test the channels in pairs with one channel located in the right half of the array being tested with a channel having equal amplitude-weighting in the left half of the array. The phase shifters 18 of the two channels under test are cycled from their initial settings through 360 degrees (through the use of controller 20). For example, assume that the channels under test are those that include radiating elements $16_{L1}$ and $16_{R1}$ and that 4-bit phase shifters $18_{L1}$ and $18_{R1}$ were set at 90 degrees in establishing the initial state. The settings of the phase shifters $18_{L1}$ and $18_{R1}$ are advanced one bit at a time (from $90° \rightarrow 112.5° \rightarrow 135° \rightarrow 157.5° \ldots \rightarrow 90°$) and the output of the summing means 38 is monitored by the threshold detector. If both phase shifters under test, $18_{L1}$ and $18_{R1}$, and their feed networks have no failures (or in the unlikely event in which they have identical failures), a zero output will be observed at the detector 38 when the phase shifters have identical settings. On the other hand, a nonzero output represents a failure in this pair of elements. Whenever an out-of-tolerance condition is detected, the information in the controller 20 can be correlated (as indicated at 44) with the detector output to determine which phase shifter 18 and which bit of the phase shifter has a failure.

With regard to testing the center channel (if any), since there is no channel having equal amplitude-weighting, this center channel may be tested with an adjacent channel. In this case, the signal from the center radiating element $16_C$ to the manifold network 32 is weighted to compensate for the difference in amplitude between the center channel and the adjacent channel. These two channels are then tested in the same manner as are the symmetrically located channels.

As an example of how the information in the controller 20 can be correlated with the detector output to isolate a failure, consider the case where one bit of a phase shifter has a stuck-to-one or a stuck-to-zero failure. This failure will be discovered when the pair of channels which includes the failure are cycled through 360 degrees. The value of the bit that has failed may be distinguished by observing the output level of the detector; but, it is impossible to tell which one of the pair of channels has the failure at this point. However the following algorithm may be used to determine which channel has the failure: When a failure occurs, the suspected bit of a first channel of the two channels is changed from zero-state to one-state, or vice versa, while the phase shifter of the second channel is unchanged. If the phase shifter of the first channel has either a stuck-to-zero or a stuck-to-one error, the change will not change the output of the detector. However, varying the phase state of an operational phase shifter will alternate the output level.

A brief discussion of the choice of the detection threshold is appropriate in discussing the capabilities of the present monitoring system. Since the purpose of the system is to detect failures in the array antenna, it is necessary to establish the minimum allowable out-of-tolerance condictions which are required to be detected. Considering an array which uses four-bit phase shifters, the minimum detectable failure will be 22.5 degrees, so that the system must alarm when there is a 22.5 degree error. Assuming the cumulative allowable tolerance for each channel is about 10 degrees, one encounters the classical detection problem of setting the threshold low enough to detect the desired signals but high enough to avoid false alarms. In this instance, a threshold can be set at about 15 degrees. If the phase error is $\phi$, the amplitude of the output from summing means 38 is $$E_\phi = 2E_0 \sin(\phi/2)$$

where $E_0$ is the amplitude contributed by one phase shifter. For an angle-error threshold of 15 degrees, the amplitude threshold must be set at $0.026E_0$ or about $-11.67$ dB relative to $E_0$. The signal levels for phase errors corresponding to the bits of a four-bit phase shifter are as follows:

| Phase Error | Signal level relative to threshold at 15 degrees |
|---|---|
| 22.5 (deg) | 3.4 (dB) |
| 45 | 9.34 |
| 90 | 14.68 |
| 180 | 17.69 |

It is clear that the larger and more serious phase errors are readily detectable.

If an amplitude error exists in one of the elements and is the same for all phase settings, then this error will produce a signal output from the summing means 38 as the phase of the element is cycled. If the amplitude of the element is given by $E_0 + \Delta E$, the maximum signal from the summing means 38 will be 2 $\Delta E$. Thus, we have $$2\Delta E = 0.26 E_0 \quad (1)$$

$$(\Delta E / E_0) = 0.13$$

This amplitude error represents a tolerance of about one dB. If it is required that the threshold be exceeded for one-half of the phase-shifter settings, as will likely be the case for phase-error detection, Eq. (1) becomes $$1.414 \Delta E = 0.26 E_0$$

$$\Delta E = 0.1838 E_0$$

and the amplitude tolerance corresponding to this signal is about 1.5 dB. The foregoing analysis indicates that there is enough signal strength for failure detection in the monitoring system.

A Monte Carlo simulation of the performance of the present monitoring system has been conducted (by digital computer) in which variations in the phase and amplitude of the output of the radiating elements caused by component tolerance, temperature change and other factors, are treated as random variables. The results of this simulation are summarized in NRL Memo. Report 3613 authored by the present inventors. This report also contains a description of the present invention and, therefore, is incorporated herein by reference. Readers who are interested in obtaining a more detailed estimate of the error detection capabilities of the invention are referred to this publication.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a radar system of the type wherein radio-frequency signals generated by a transmitter are propagated in a desired radiation pattern from an array antenna including a plurality of radiating elements, each radiating element having a different associated phase-shifting element, a maintenance monitoring system comprising:

control means for controlling the initial settings of the phase-shifting elements to provide an initial radiation pattern and thereafter selectively controlling the settings of the phase-shifting elements associated with symmetrically located pairs of radiating elements;

manifold means for receiving a portion of the signals radiated from each of said radiating elements and having an output, said manifold means operating on input signals to cause the signals received during the initial radiation pattern from symmetrically located radiating elements to differ by 180° at said output;

compensating means, coupled to the output of said manifold means, for providing an adjustment signal which combines with said output signal to adjust said output signal to approximately zero during said initial radiation pattern, said adjustment signal being maintained at the value which provided said zero output signal during said initial radiation pattern; and detection means coupled to said adjusted output signal for indicating said adjusted output signal.

2. The monitoring system as recited in claim 1 wherein said compensating means comprises:

summing means having a first input coupled to the output of said manifold means, a second input receiving rf energy from said transmitter, and an output which is coupled to said detection means;

gain control means for adjusting the phase and amplitude of an input signal in response to an error signal received on a control input, and having an output, said gain control means having its signal input coupled to the transmitter for receiving rf energy, its control input coupled to the output of said summing means, and its output coupled to the second input of said summing means; and switching means coupled between the output of said summing means and the control input of said gain control means.

3. A method of monitoring the operability of a radar system having an array antenna including a plurality of channels, each channel having a radiating element and a phase-shifting element comprising the steps of:

(a) setting an initial phase shift in the phase-shifting elements to provide a desired radiation pattern;
(b) sampling the outputs of the radiating elements;
(c) shifting the phase of said sampled signals so that the sampled signals from symmetrically located pairs of radiating elements differ by 180 degrees if each channel is operating properly;

(d) combining said sampled signals to provide an output signal;

(e) applying a compensating signal to said output signal so that the value of the compensated output signal is set to approximately zero, said compensating signal being maintained at this value during the following steps;

(f) examining the operation of the channels in pairs, said step of examining comprising the steps of:

(g) cycling the setting of the phase-shifting elements associated with symmetrically located pairs of radiating elements through 360 degrees while measuring the compensated output signal, a nonzero output signal indicating a malfunction in one of the pair of channels being cycled; and (h) correlating the amplitude of said compensated output signal with the settings of said phase-shifting elements to further define the location of the malfunction.

4. A method as recited in claim 3 wherein the step (a) comprises the step of:

setting an initial phase shift in the phase-shifting elements to provide an omnidirectional radiation pattern.

5. A method as recited in claim 4 wherein step (a) comprises the step of:

setting the phase shift of the phase-shifting elements of channels located on a first side of the array center to random values and setting the phase shift of the phase-shifting elements of channels symmetrically located on a second side of the array center to the same random value; and wherein steps (c) and (d) comprise the step of:

subtracting the sampled signals received from the first side and the sampled signal received from the second side to provide an output signal.

6. In a radar system of the type wherein radio-frequency signals generated by a transmitter are propagated in a desired radiation pattern from an array antenna including a plurality of radiating elements, each radiating element having a different associated phase-shifting element, a maintenance monitoring system comprising:

control means for controlling the initial settings of the phase-shifting elements to provide an initial radiation pattern and for thereafter selectively controlling the settings of the phase-shifting elements associated with symmetrically located pairs of radiating elements;

manifold means for receiving a portion of the signal radiated from the radiating elements that are not located at the center of the array and having an output, said manifold means operating on input signals to cause the signals received during the initial radiation pattern from symmetrically located radiating elements to differ by 180 degrees at said output;

compensating means, coupled to the output of said manifold means, for providing an adjustment signal which combines with said output signal to adjust said output signal to approximately zero during said initial radiation pattern, said adjustment signal being maintained at the value which provided said zero output signal during said initial radiation pattern; and detection means coupled to said adjusted output signal for indicating said adjusted output signal.

7. A method of monitoring the operability of a radar system having a linear array antenna including a plurality of channels, each channel having a plurality of radiating elements each of which has a different phase-shifting element associated with it, said method comprising the steps of:

(a) setting an initial phase shift in the phase-shifting elements of channels located on a first side of the array center to random values and setting the phase shift of the phase-shifting elements of channels symmetrically located on a second side of the array center to the same random value;

(b) sampling the outputs of the radiating elements;

(c) subtracting the sampled signals received from the first side and the sampled signal received from the second side to provide an output signal;

(d) applying a compensating signal to said output signal so that the value of the compensated output signal is set to approximately zero, said compensating signal being maintained at this value during the following steps;

(e) examining the operation of the channels in pairs, said step of examining comprising the steps of:

(f) cycling the setting of the phase-shifting elements associated with symmetrically located pairs of radiating elements through 360 degrees while measuring the compensated output signal, a nonzero output signal indicating a malfunction in one or the pair of channels being cycled; and (g) correlating the amplitude of said compensated output signal with the settings of said phase-shifting elements to further define the location of the malfunction.

8. In a radar system of the type wherein radio-frequency signals generated by a transmitter are propagated in a desired radiation pattern from an array antenna including a plurality of radiating elements, each radiating element having a different associated phase-shifting element, the number of elements being an odd number, a maintenance monitoring system comprising:

control means for controlling the initial settings of the phase-shifting elements to provide an initial radiation pattern and for thereafter selectively controlling the settings of the phase-shifting elements associated with symmetrically located pairs of radiating elements;

manifold means for receiving a portion of the signal radiated from the center radiating element and the radiating elements that are not located at the center of the array and having an output, said manifold means operating on input signals to cause the signals received during the initial radiation pattern from symmetrically located radiating elements to differ by 180 degrees at said output;

compensating means, coupled to the output of said manifold means, for providing an adjustment signal which combines with said output signal to adjust said output signal to approximately zero during said initial radiation pattern, said adjustment signal being maintained at the value which provided said zero output signal during said initial radiation pattern; and detection means coupled to said adjusted output signal for indicating said adjusted output signal.

* * * * *